United States Patent
Purcell

(10) Patent No.: US 8,136,864 B2
(45) Date of Patent: Mar. 20, 2012

(54) INJECTION MOLDED MAGNESIUM LINK AND METHOD OF MAKING AN INJECTION MOLDED MAGNESIUM LINK

(75) Inventor: George F. Purcell, Southgate, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 145 days.

(21) Appl. No.: 12/252,102

(22) Filed: Oct. 15, 2008

(65) Prior Publication Data

US 2009/0261615 A1  Oct. 22, 2009

Related U.S. Application Data

(60) Provisional application No. 60/979,922, filed on Oct. 15, 2007.

(51) Int. Cl.
*B60J 7/08* (2006.01)
(52) U.S. Cl. ....................................... 296/108
(58) Field of Classification Search ............... 296/108
See application file for complete search history.

(56) References Cited

U.S. PATENT DOCUMENTS

| | | | |
|---|---|---|---|
| 2,617,681 A | 11/1952 | Hawver et al. | |
| 2,970,007 A | 1/1961 | Hennessy | |
| 3,342,524 A | 9/1967 | Adamski | |
| 4,720,133 A * | 1/1988 | Alexander et al. | 296/117 |
| 4,896,736 A * | 1/1990 | Smith | 180/89.16 |
| 4,979,779 A * | 12/1990 | Williams | 297/465 |
| 5,074,163 A * | 12/1991 | Baumann | 74/512 |
| RE34,033 E | 8/1992 | Godette | |
| 5,161,852 A | 11/1992 | Alexander et al. | |
| 5,533,421 A * | 7/1996 | Damerow et al. | 74/563 |
| 5,575,181 A * | 11/1996 | Baumann | 74/512 |
| 5,601,304 A * | 2/1997 | Tilly et al. | 280/124.15 |
| 5,667,269 A | 9/1997 | Prenger et al. | |
| 5,785,375 A * | 7/1998 | Alexander et al. | 296/108 |

(Continued)

FOREIGN PATENT DOCUMENTS
WO    2005/084289 A2    9/2005

OTHER PUBLICATIONS

LeBeau, Stephen et al, "Thixomolding: Plastic Injection Molding Turns to Metal," Engineered Casting Solutions, Fall 2002, pp. 33-35.

*Primary Examiner* — Kiran B Patel
(74) *Attorney, Agent, or Firm* — Brooks Kushman P.C.

(57) ABSTRACT

In one embodiment, an operational link of a top stack linkage for a convertible top of a vehicle is presented. The link has a spine having a main body portion and an offset portion and one or more lateral structural members including at least one reinforcing rib. The spine and the one or more lateral structural members may form a unitary pivot link. In another embodiment, a method of manufacturing a pivot link of a top stack linkage for a convertible top of a vehicle is presented. The method includes providing a mold defining an interior cavity that defines the shape of a pivot link, injecting molten magnesium into the mold, and molding the molten magnesium injected into the mold to form a spine and a plurality of lateral structural members that are integral with the spine to form a monolithic pivot link.

13 Claims, 3 Drawing Sheets

U.S. PATENT DOCUMENTS

| | | | |
|---|---|---|---|
| 5,992,264 A * | 11/1999 | Brock, Sr. | 74/502.6 |
| 6,003,897 A * | 12/1999 | Dostert et al. | 280/781 |
| 6,039,384 A | 3/2000 | Wchulte et al. | |
| 6,041,752 A | 3/2000 | van Kompenburg | |
| 6,109,586 A * | 8/2000 | Hoek | 248/476 |
| 6,214,478 B1 | 4/2001 | Soell et al. | |
| 6,513,407 B1 | 2/2003 | Higgins | |
| 6,582,087 B2 * | 6/2003 | Whitehead et al. | 359/841 |
| 7,208,943 B2 * | 4/2007 | Godoy et al. | 324/207.25 |
| 7,230,419 B2 * | 6/2007 | Godoy et al. | 324/207.25 |
| 7,419,222 B2 * | 9/2008 | Schmitz et al. | 297/440.2 |
| 7,717,221 B2 * | 5/2010 | Anderson et al. | 180/335 |
| 2001/0006302 A1 | 7/2001 | Nagayasu et al. | |
| 2002/0189779 A1 | 12/2002 | Knott et al. | |
| 2003/0090129 A1 * | 5/2003 | Riley et al. | 296/203.03 |
| 2004/0003911 A1 | 1/2004 | Vining et al. | |
| 2010/0187853 A1 * | 7/2010 | Just | 296/108 |
| 2010/0206122 A1 * | 8/2010 | Seiltz | 74/512 |

\* cited by examiner

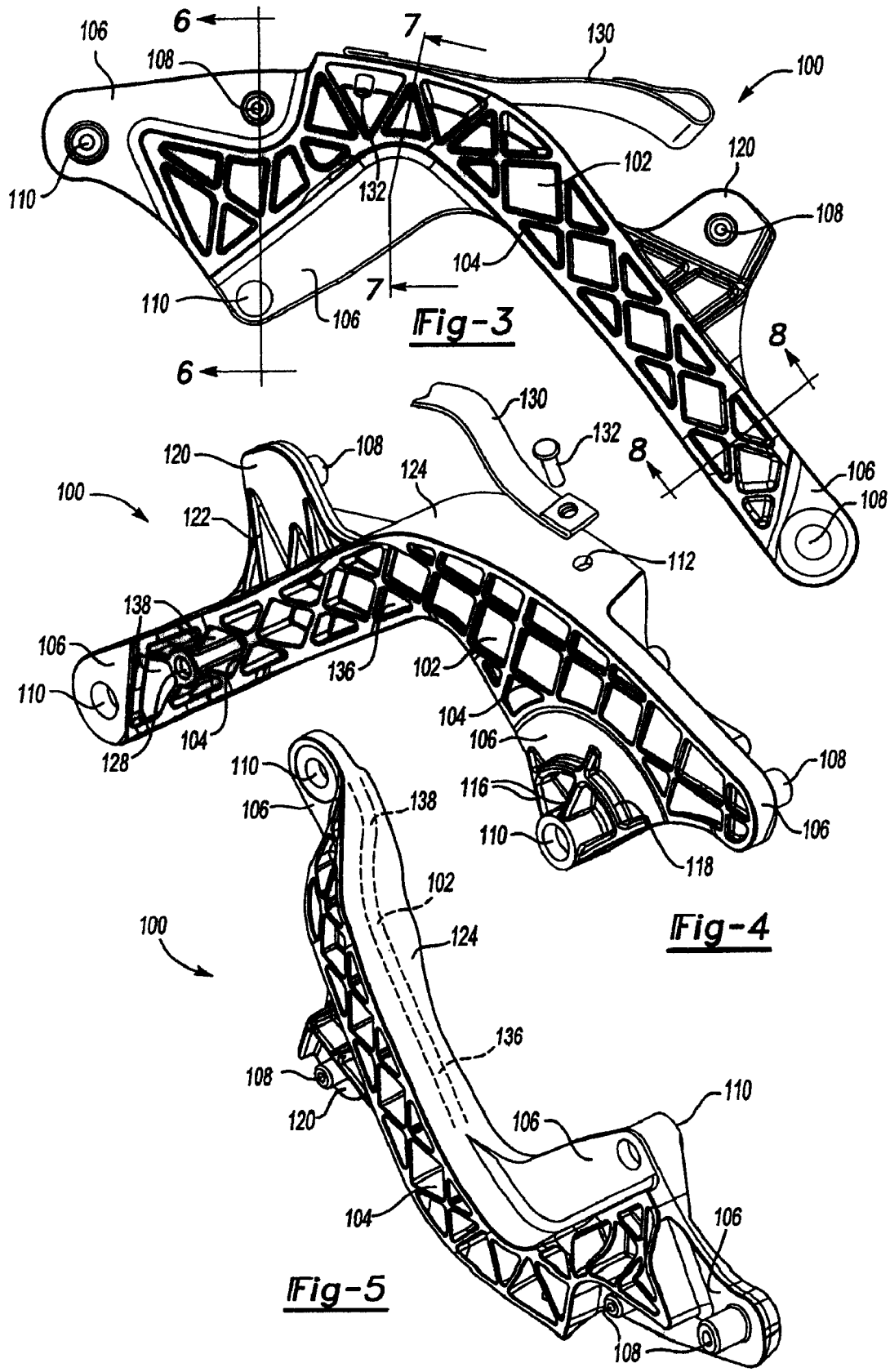

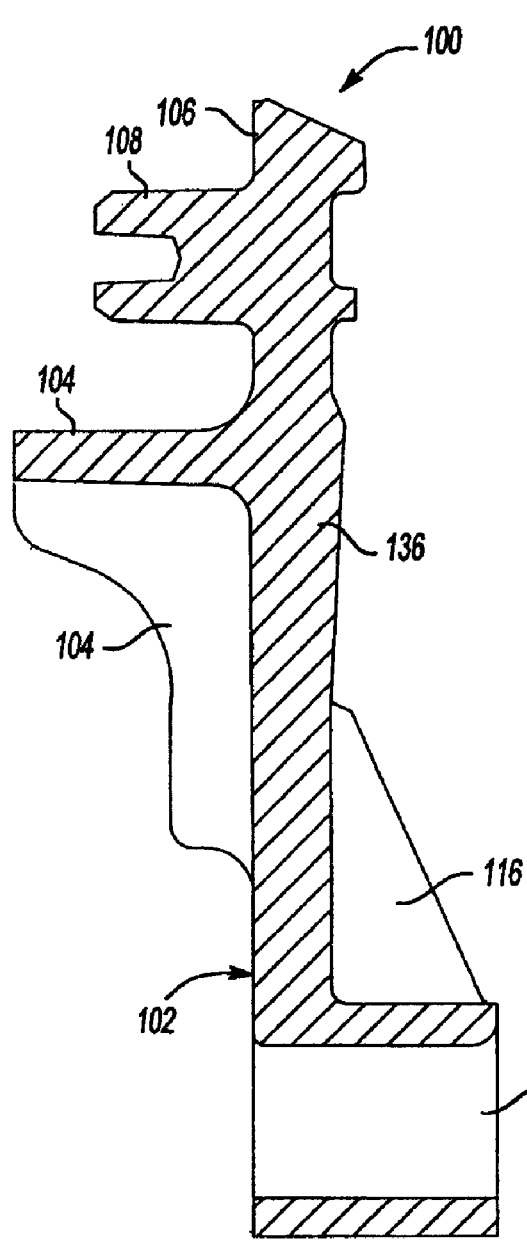
_Fig-6_
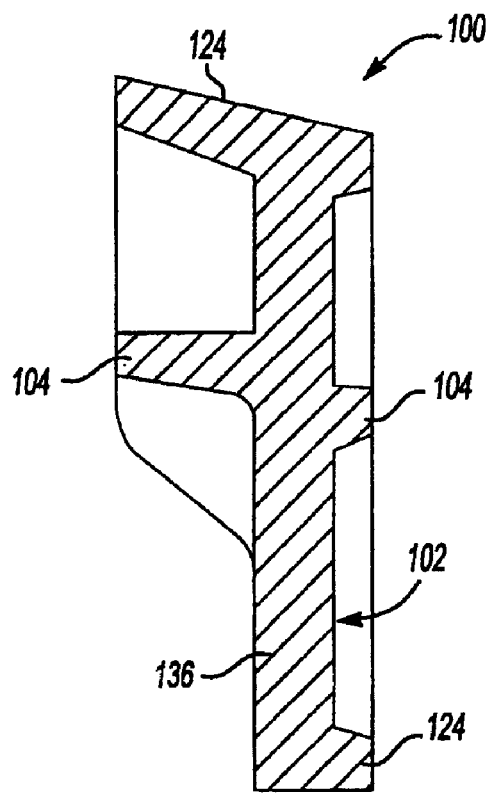
_Fig-7_
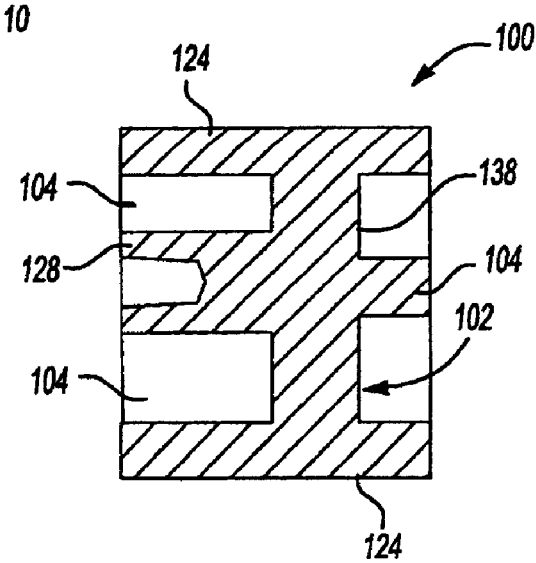
_Fig-8_

INJECTION MOLDED MAGNESIUM LINK AND METHOD OF MAKING AN INJECTION MOLDED MAGNESIUM LINK

CROSS-REFERENCE TO RELATED APPLICATIONS

This application claims the benefit of U.S. provisional application Ser. No. 60/979,922 filed Oct. 15, 2007.

BACKGROUND OF THE INVENTION

1. Field of the Invention

The present invention relates to a link for an articulated linkage, such as a convertible top stack linkage, that is formed by injection molding magnesium to form a link with integral reinforcing ribs, integral pivot pins and integral bushings.

2. Background

Vehicles may be provided with roofs that are movable between an extended position and a retracted position, such as convertible tops and retractable hardtops. These types of vehicle roofs are generally constructed to be moved between the extended and retracted position on an articulated linkage that is commonly referred to as a top stack linkage. It has previously been proposed in the Applicant's assignee's PCT application Serial No. PCT/US2005/006522, filed Feb. 28, 2005 to form parts of the bows and rails of the top stack with an injection molded magnesium forming process. The prior application disclosed the use of stamped metal links to interconnect the side rails and bows of the top stack. Some of the links also incorporated tubular portions that were formed into required shapes and provided with end fittings to secure the links to the side rail, other links and bows.

SUMMARY OF THE INVENTION

One aspect of the present invention is to provide an operational link of a top stack linkage for a convertible top of a vehicle. The link includes a spine extending through a length and a width of the link and may have a first side and a second side. The spine may have a main body portion and an offset portion. The offset portion is offset relative to the main body portion. The link further includes a plurality of reinforcing ribs integrally molded to the spine and extending from at least one of a first side or a second side of the link. The plurality of reinforcing ribs may also extend through the length and width of the spine. In one embodiment, the plurality of reinforcing ribs may extend from both the first and the second side of the link. The operational link further includes a plurality of lateral structural members integrally molded with the spine. The spine, the plurality of reinforcing ribs, and the lateral structural members may form a single and unitary link.

In some embodiments, the link may have a front portion and a back portion that define planar flange portions of the pivot link. The front portion and the back portion may lack reinforcing ribs.

In other embodiments, the plurality of lateral structural members of the operation link may include a plurality of bushings. At least one of the plurality of bushings may include a plurality of radially extending ribs interconnected by a circumferentially extending rib for reinforcing the at least one bushing.

In other embodiments, the plurality of lateral members of the operational link may include a peripheral wall and a plurality of integral pins. As such, the operation link may further include a pivot flange extending outwardly from the peripheral wall. The pivot flange may support at least one of the plurality of integral pins. The plurality of lateral structural members may include a plurality of ribs extending vertically from the link which reinforce the pivot flange. The peripheral wall may have one or more attachments secured to the peripheral wall by a fastener. For example, the one or more attachments may be a top support strap and the fastener may be a threaded fastener, rivet, or pin. The peripheral wall may have a fastener receptacle hole for securing the fastener to the peripheral wall.

In other embodiments, the plurality of lateral structural members of the operational link may include an interior receptacle boss. The boss may be located at the offset portion of the spine. Furthermore, the interior receptacle boss may be supported about its periphery by a plurality of reinforcing ribs.

Another aspect of the present invention provides for a method of manufacturing a link of a top stack linkage for a convertible top of a vehicle. The method includes providing a mold defining an interior cavity that defines the shape of a pivot link. The method further includes injecting molten magnesium into the mold. The method further includes molding the magnesium injected mold to form a spine. The spine may have a plurality of lateral structural members that are integrally molded with the spine to form a single and unitary link. In one embodiment, the spine has a main body portion and at least one offset portion that is not coplanar relative to the main body portion.

In some embodiments, the plurality lateral structural members may include a plurality of reinforcing ribs. Accordingly, the method may further include molding the plurality of reinforcing ribs to reinforce the pivot link and maintain a spatial orientation of the offset portion relative to the main body portion.

In other embodiments, the pivot link may include a front portion and a back portion that define planar flange portions of the pivot link. Accordingly, the molding step may further include forming the planar flange portions for permitting a plurality of adjacent links to pivot relative to the pivot link.

In other embodiments, the plurality of lateral structural members may include a plurality of pins disposed at spaced locations on the spine. Accordingly, the method may further include connecting a plurality of links and a plurality of bows to the pivot link.

In other embodiments, the plurality of lateral structural members may include a plurality of bushings disposed at spaced locations on the spine. The plurality of bushings may be reinforced by a plurality of radially extending ribs interconnected by circumferentially extending ribs. Accordingly, the method may further include inserting a plurality of pins in the plurality of bushings for connecting adjacent links to the pivot link.

Another aspect of the present invention provides for an operational link of a top stack linkage for a convertible top of a vehicle. The operation link includes a spine extending through a length and a width of the link. The link may have a first side and a second side. The spine may also have a main body portion and an offset portion. The offset portion is offset relative to the main body portion. The operation link further includes a plurality of reinforcing ribs extending from at least one of the first side or second side of the link. The reinforcing ribs may further extend through a length and width of the spine. In one embodiment, the plurality of reinforcing ribs may be varied in length.

The operation link further includes a plurality of pins integral with the spine. The pins may be disposed at spaced locations on the spine for securing a plurality of other links and bows to the link. The operation link further includes a plurality of bushings integral with and disposed at spaced locations on the spine for connecting the link to a plurality of other links. The plurality of bushings may be reinforced by a plurality of radially extending ribs interconnected by circumferentially extending ribs. The operation link further includes an interior receptacle boss located at the offset portion of the spine. The boss may be supported about its periphery by a plurality of reinforcing ribs. The operational link further includes a peripheral wall substantially extending around the periphery of the link. The spine, the plurality of reinforcing ribs, the plurality of pins, the plurality of bushings, the interior receptacle boss, and the peripheral wall may be formed as a single and unitary pivot link.

These and other aspects of the present invention will be better understood in view of the attached drawings and following detailed description of the invention.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

FIG. 3 is a side elevation view of a pivot link made according to one embodiment of the present invention;

FIG. 4 is a perspective view of the pivot link made according to one embodiment of the present invention;

FIG. 5 is an inverted perspective view of the pivot link made according to one embodiment of the present invention;

FIG. 6 is a cross-sectional view taken along the plane of section of line 6-6 in FIG. 3;

FIG. 7 is a cross-sectional view taken along the line of section of line 7-7 in FIG. 3; and FIG. 8 is a cross-sectional view taken along the plane of section of line 8-8 in FIG. 3.

DETAILED DESCRIPTION OF THE PREFERRED EMBODIMENT(S)

Figures 1, 2:
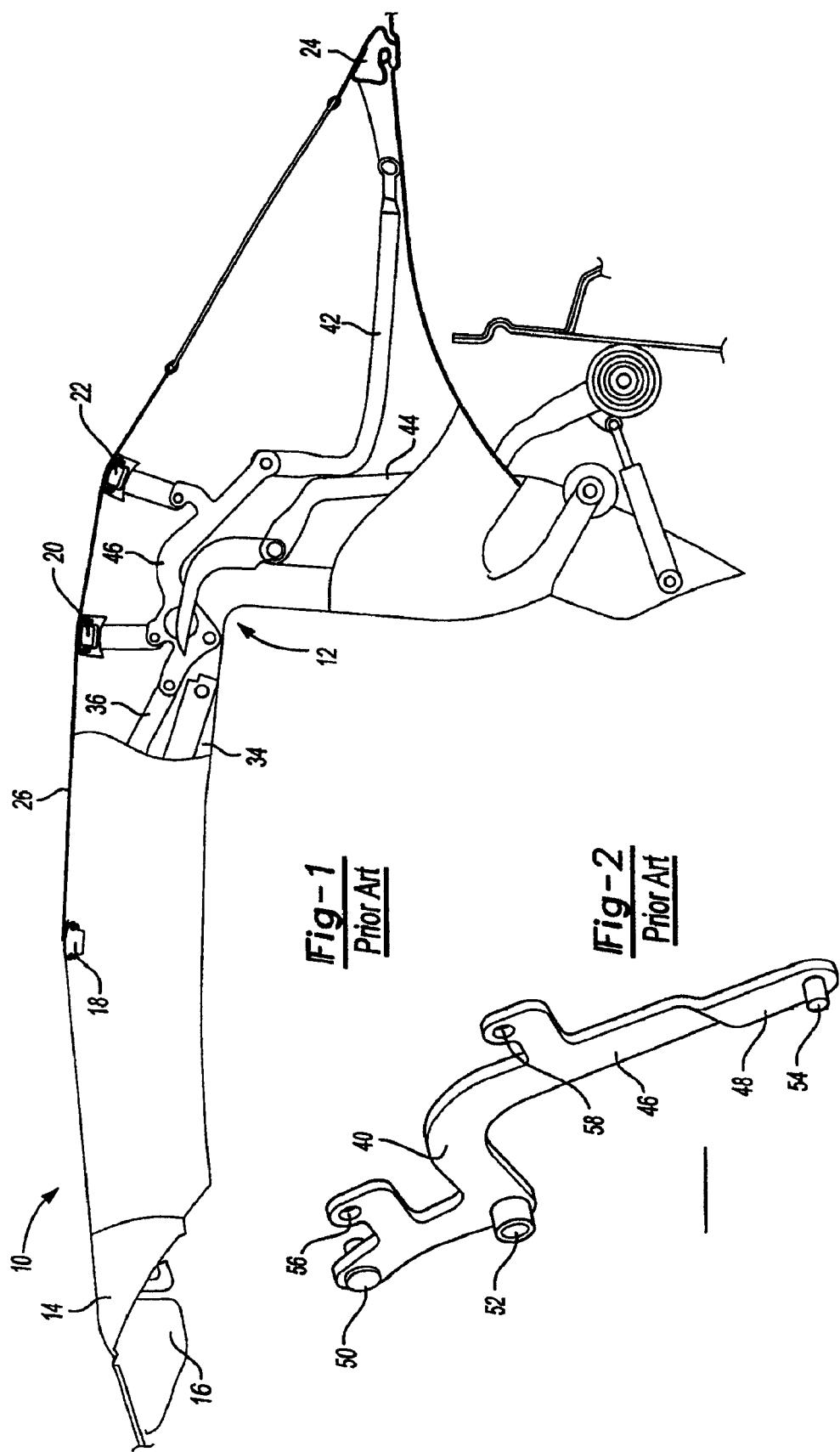
FIG. 1 is a side elevation view of a prior art convertible top and top stack linkage made with fabricated operational links.
FIG. 2 is a perspective view of a prior art pivot link that is stamped, machined and assembled in accordance with a prior art manufacturing method.

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

By way of background, the top stack linkage disclosed in Applicant's prior co-pending application will be generally described. Referring to FIG. 1, a convertible top 10 is illustrated, including a top stack 12. The convertible top 10 includes a one bow 14 that is adapted to be secured to a windshield header 16. Moving rearwardly from the one bow, the other bows of the top stack 12 are identified as a two bow 18, a three bow 20, a four bow 22 and a five bow 24. The bows support a top cover 26 and extend transversely relative to the vehicle when the convertible top 10 is in its extended position. The two bow 18, three bow 20 and four bow 22 are assemblies including extruded portions and injection molded magnesium portions. The one bow 14 is integrally formed with the front rail (not shown) which is connected to a center rail 32. The center rail 32 is articulately connected to rear rail 34. The one bow 14, front rail, side rail 32 and rear rail 34 all may be formed as injection molded magnesium parts. The rails define a portion of the perimeter of the convertible top with the top cover fabric being secured to the rail to provide a tight fitting convertible top.

In the prior implementation of this convertible top, it was believed to be necessary to form the operational links of the top stack as either stamped parts or formed tubular parts to obtain parts having the desired durability in a cost-effective manner. For example, the control link 36, pivot link 40 (FIG. 2), pressure link 42 and balance link 44 were all previously formed with either a metal stamping operation or tube forming and welding process. The cost associated required for stamping steel plate, hydroforming tubular members and welding adds to the cost of the parts. Also, the pivot points in many instances required machining operations and separate bushings that also added to the cost of the entire assembly. Assembling the parts together with separate pins required careful alignment of the pins and an intricate assembly procedure. Close tolerances must be met to provide a top stack linkage that can be reliably and repeatedly assembled without complications resulting from tolerance stack up.

Referring to FIG. 2, a perspective view of the pivot link 40 is provided. The prior art pivot link is a complicated part that is critical to operation of the top. The pivot link 40 has a main body portion 46 that is generally formed to lie in a single plane. An offset portion 48 is offset from the plane of the main body portion 46. A pivot pin 50 is provided for connecting the front end of the pivot link to the control link 36. A tubular receptacle 52 is provided on the pivot link 40 that receives a fastener (not shown) for connecting the control link to the rear rail 34. A pin 54 is secured to the rear portion of the pivot link 40 which connects the pivot link 40 to the pressure link 42. In addition, a three bow opening 56 and four bow opening 58 are provided on the pivot link 40 for attachment to the three bow 20 and four bow 22, respectively. To assure proper operation of the top 10, five connection points on the pivot link 40 must conform to closely held tolerances. To assure such close tolerances, the orientation of the main body portion 46 relative to the offset portion 48 must be precisely aligned when initially manufactured. Through use, stamped parts and formed tubular members may be bent if the top is impacted by a foreign object, either from a source external to the vehicle or in the course of extending or retracting the convertible top. Any distortion of the formed part may complicate, or interfere with, proper operation of the top 10. The present invention is directed to overcoming the problems identified above in regard to the prior top, and more specifically, with regard to the operational links thereof.

Referring to FIGS. 3-5, a monolithic pivot link 100 is illustrated as an example of an operational link of a top stack linkage that may be made in accordance with the present invention. It should be understood that other operational links, including, but not limited to the links that would replace the prior art pressure link 42, balance link 44 and other operational links, may be manufactured including various combinations of the structural elements of the monolithic pivot link 100. The pivot link 100 includes a spine 102 in the form of a wall that extends through the length and width of a substantial portion of the pivot link 100 as shown in FIGS. 3-5 and 6-8 at the end of the lead line for spine 102. A plurality of reinforcing ribs 104 extend from one or both sides of the wall extending through a substantial portion of the pivot link 100. The length, thickness, shape and orientation of the reinforcing ribs 104 may be varied depending upon the structural requirements of the pivot link 100. These parameters may be varied depending upon the space available within the top stack linkage structure to allow for clearance of relatively movable parts of the top stack linkage. Planar flange portions 106 may be provided as required to permit adjacent links to pivot relative to the pivot link 100. Such planar portions 106 may be provided where no reinforcing ribs are required in the planar flange portions 106.

Integral pins 108 may be provided at desired locations where other links and bows are secured to pivot link 100. The integral pins 108 are formed to net size and shape in precisely located positions to assure easy assembly and smooth operation of connected parts.

Integral bushings 110 may be formed on the pivot link 100 at desired locations to receive pins that connect the pivot link 100 to adjacent links and supporting structures. Integral bushings 110 are formed to net size and shape at desired locations precisely and without need for additional machining or surface finishing to provide a finished part because the pivot link 100 is formed of magnesium in an injection molding process.

With particular reference to FIG. 4 and continued reference to FIGS. 3 and 5, one of the integral bushings 110 is shown to include a plurality of radially extending ribs 116 that are interconnected by a circumferentially extending rib 118. The radially extending ribs 116 and circumferentially extending rib 118 reinforce the integral bushing 110.

A pivot flange 120 supports integral pin 108. The pivot flange 120 is reinforced by triangular ribs 122. The triangular ribs 122 reinforce the opposite side of the pivot flange 120 from the pin 108. The pivot flange 120 extends outwardly from a peripheral wall 124 of the pivot link 100.

The peripheral wall 124 extends substantially around the entire periphery of the pivot link 100. The peripheral wall 124 provides additional reinforcement and a smooth exterior for the pivot link 100.

An interior receptacle boss 128 is provided that is supported about its periphery by reinforcing ribs 104. The interior receptacle boss 128 will be further described below with reference to FIG. 8.

The term "lateral structure members" as used in this disclosure generally refers to protrusions that extend laterally, or in the cross-car direction from the spine 102. Examples of lateral structural members may include one or more of the following: reinforcing ribs 104, pins 108, bushings 110, radially extending ribs 116, circumferentially extending ribs 118, triangular ribs 122, peripheral wall 124, or receptacle boss 128.

A top support strap 130 is shown in FIGS. 3 and 4. The top support strap 130, or other types of attachments, may be secured to the peripheral wall 124 of the pivot link 100 by a fastener 132. The fastener 132 may be a pin that is secured to the fastener receptacle hole 112. The fastener 132 may be a threaded fastener, rivet or pin. The fastener 132 may be secured within the fastener receptacle hole 112 by a press-on spring nut (not shown) to facilitate assembly.

With particular reference to FIG. 5 and continued reference to FIGS. 3 and 4, the monolithic pivot link 100 may include a main body portion 136 of the spine 102. In addition, an offset portion 138 of the spine 102 may be provided as part of the pivot link 100. The offset portion 138 is disposed in a plane that is offset relative to the plane of the main body portion 136. Multiple offset portions 138 may be provided along the spine 102. The reinforcing ribs 104 function to reinforce the pivot link and also maintain the spatial orientation of the offset portion 138 relative to the main body portion 136.

Referring to FIG. 6, a section is taken through the main body portion 136. An integral pin 108 is shown extending from a planar flange portion 106. In addition, reinforcing ribs 104 are shown extending from one side of the main body portion 136. The reinforcing ribs 104 may extend from the spine 102 to a varying extent as required to locally reinforce the spine 102. The integral bushing 110 shown in FIG. 6 is reinforced by radially extending ribs 116 that serve to reinforce and fix the position of the inner bushing 110.

Referring to FIG. 7, a different section is taken through the pivot link 100 in the main body portion 136 of the spine 102. The reinforcing rib 104 is shown on the left side of FIG. 7 that is substantially longer than the reinforcing rib shown on the right side of FIG. 7. The ability to vary the length of the reinforcing ribs 104 permits reinforcement of the spine 102 to a greater or lesser extent depending upon the clearance available on either side of the spine 102. The peripheral wall 124 is also shown in FIG. 7 which reinforces the periphery of the spine 102.

Referring to FIG. 8, a section is taken through the offset portion 138 of the spine 102 of the link 100. An interior receptacle boss 128 is shown that is supported by reinforcing ribs 104. The interior receptacle boss 128 provides a blind opening in one side of the pivot link 100 in which a screw or other fastener may be secured. A reinforcing rib 104 may be provided on the opposite side of the spine 102 from the interior receptacle boss 128. The peripheral wall 124 reinforces the spine in the offset portion 138 on both sides of the interior receptacle boss 128.

The monolithic pivot link 100 is formed in an injection molding process in which molten magnesium is injected into a mold. The mold defines an interior cavity corresponding precisely to the net size and shape of the pivot link 100. The injection molding process permits the spine 102, including its main body portion 136 and offset portion 138, to be molded in a single step. Reinforcing ribs 104, planar flange portions 106, integral pins 108, and integral bushings are also formed as a single part that is integral with the spine 102. Fastener receptacle holes 112 may be formed without the need to drill or machine the pivot link after the molding step.

In addition, the radially extending ribs 116, circumferentially extending rib 118, triangular ribs 122 and peripheral wall 124 are also integrally formed with the spine 102. In sum, the entire monolithic pivot link 100 may be formed in a single molding operation.

The manufacturing process may be applied to other operational links, as previously indicated, with design flexibility being obtained by defining the required planes of the spine 102 and then reinforcing one or both sides of the link using variable length reinforcing ribs. Joints in the link may be provided in the form of bushing or pins that are integrally formed on the link.

According to the magnesium injection molding process described herein, a durable and extensively reinforced operating link may be provided that has precisely located pins, bushings and other connection points that require no machining. The link made according to the process results in substantial cost savings as a result of reducing the number of parts and manufacturing steps required to provide a robust link that may be adapted to a wide variety of link designs.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An operational link of a top stack linkage for a convertible top of a vehicle, the link comprising:
 a spine having a wall with a first side and a second side, including a main body portion and at least one offset portion disposed in a plane that is offset relative to the plane of said main body portion;
 at least one lateral structural member including a plurality of reinforcing ribs that extend laterally from one side of said first side and said second side of the wall and integral with the spine to maintain a spatial orientation of said offset portion relative to said main body portion;
 wherein at least one planar flange of the link that extends outwardly from the link; and
 at least one second lateral structural member selected from the group of a pin on said planar flange, a bushing on said planar flange and a receptacle boss supported about its periphery by said plurality of reinforcing ribs to form a unitary pivot link.

2. The operational link of claim 1 wherein the spine comprises multiple offset portions.

3. The operational link of claim 1 wherein the spine includes a front portion and a back portion, and at least one planar flange extending from one of said front and said back portion without lateral structural members.

4. The operational link of claim 1 wherein said second lateral structural member is a bushing, reinforced by a plurality of radially extending ribs interconnected by a circumferentially extending rib.

5. The operational link of claim 1 wherein said at least one lateral structural member includes a peripheral wall and a plurality of integral pins, and wherein the link further comprises a pivot flange extending outwardly from the peripheral wall and supports at least one of the plurality of integral pins.

6. The operational link of claim 5 wherein said at least one lateral structural member includes a plurality of ribs extending laterally from the spine and the pivot flange is reinforced by the plurality of ribs.

7. The operational link of claim 6 further comprising one or more attachments secured to the peripheral wall by a fastener.

8. The operational link of claim 7 wherein the one or more attachments is a top support strap.

9. The operational link of claim 7 wherein the peripheral wall further includes a fastener receptacle hole for securing the one or more attachments to the peripheral wall by the fastener.

10. The operational link of claim 1 wherein said at least one lateral structural member includes a receptacle boss located at the offset portion of the spine, the receptacle boss being supported about its periphery by the plurality of reinforcing ribs.

11. The operational link of claim 1 and further comprising a peripheral wall extending substantially around a periphery of the link, and one or more attachments secured to the peripheral wall by a fastener.

12. The operational link of claim 11 wherein the one or more attachments is a top support strap.

13. The operational link of claim 11 wherein the peripheral wall further includes a fastener receptacle hole for securing the one or more attachments to the peripheral wall by the fastener.

* * * * *